United States Patent
Huff

(10) Patent No.: US 12,268,332 B2
(45) Date of Patent: Apr. 8, 2025

(54) VERTICAL GRILLING ASSEMBLY

(71) Applicant: Jason Huff, Katy, TX (US)

(72) Inventor: Jason Huff, Katy, TX (US)

( * ) Notice: Subject to any disclaimer, the term of this patent is extended or adjusted under 35 U.S.C. 154(b) by 856 days.

(21) Appl. No.: 17/464,786

(22) Filed: Sep. 2, 2021

(65) Prior Publication Data
US 2023/0069335 A1    Mar. 2, 2023

(51) Int. Cl.
| | | |
|---|---|---|
| A47J 37/07 | (2006.01) | |
| A47J 36/32 | (2006.01) | |
| F24C 1/04 | (2021.01) | |
| F24C 3/10 | (2006.01) | |
| F24C 15/00 | (2006.01) | |
| F24C 15/08 | (2006.01) | |
| F24C 15/14 | (2006.01) | |

(52) U.S. Cl.
CPC .......... *A47J 37/0727* (2013.01); *A47J 36/32* (2013.01); *A47J 37/0722* (2013.01); *A47J 37/0759* (2013.01); *A47J 37/0786* (2013.01); *F24C 1/04* (2013.01); *F24C 15/002* (2013.01); *F24C 15/14* (2013.01); *A47J 2202/00* (2013.01); *F24C 3/10* (2013.01); *F24C 15/08* (2013.01)

(58) Field of Classification Search
CPC .... A47J 2202/00; A47J 36/32; A47J 37/0722; A47J 37/0727; A47J 37/0759; A47J 37/0786; A47J 37/07; F24C 1/04; F24C 15/002; F24C 15/08; F24C 15/14; F24C 3/10; F24C 15/00; H04L 12/28; H04L 69/40
See application file for complete search history.

(56) References Cited

U.S. PATENT DOCUMENTS

| | | | |
|---|---|---|---|
| 521,718 A | 6/1894 | Koll | |
| 2,335,217 A | 11/1943 | Tate | |
| 2,821,127 A | 1/1958 | Hess | |
| 6,095,130 A | 8/2000 | Faraij | |
| D598,698 S | 8/2009 | Lee | |
| 2004/0200825 A1* | 10/2004 | Ahuja | F24C 1/04 |
| | | | 219/400 |
| 2006/0042620 A1 | 3/2006 | Luoma | |
| 2016/0095472 A1* | 4/2016 | Dahle | F24C 15/16 |
| | | | 99/447 |
| 2016/0235078 A1 | 8/2016 | Farina | |
| 2017/0164783 A1* | 6/2017 | Sauerwein | A47J 37/0786 |
| 2021/0196078 A1* | 7/2021 | Colston | A47J 37/0786 |

FOREIGN PATENT DOCUMENTS

WO    WO2007068065    6/2007

* cited by examiner

*Primary Examiner* — Brian W Jennison
*Assistant Examiner* — Adam E Eckardt

(57) ABSTRACT

A vertical grilling assembly for uniform grilling of food with reduced flareups includes a housing, which defines an interior space. A retaining unit, which is engaged to a food item is insertable through an opening, which is positioned in a front of the housing, so that the food item is positioned in the interior space substantially equally distant from opposed sides of the housing. A first door is hingedly engaged to the housing and is positioned to selectively close the opening. A pair of heaters is engaged singly to the opposed sides of the housing and positioned in the interior space. The heaters selectively heat the interior space to grill the food item. A controller is engaged to the housing and is operationally engaged to the pair of heaters. The controller is positioned to control heat output from the pair of heaters.

18 Claims, 5 Drawing Sheets

VERTICAL GRILLING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

Figure 1:
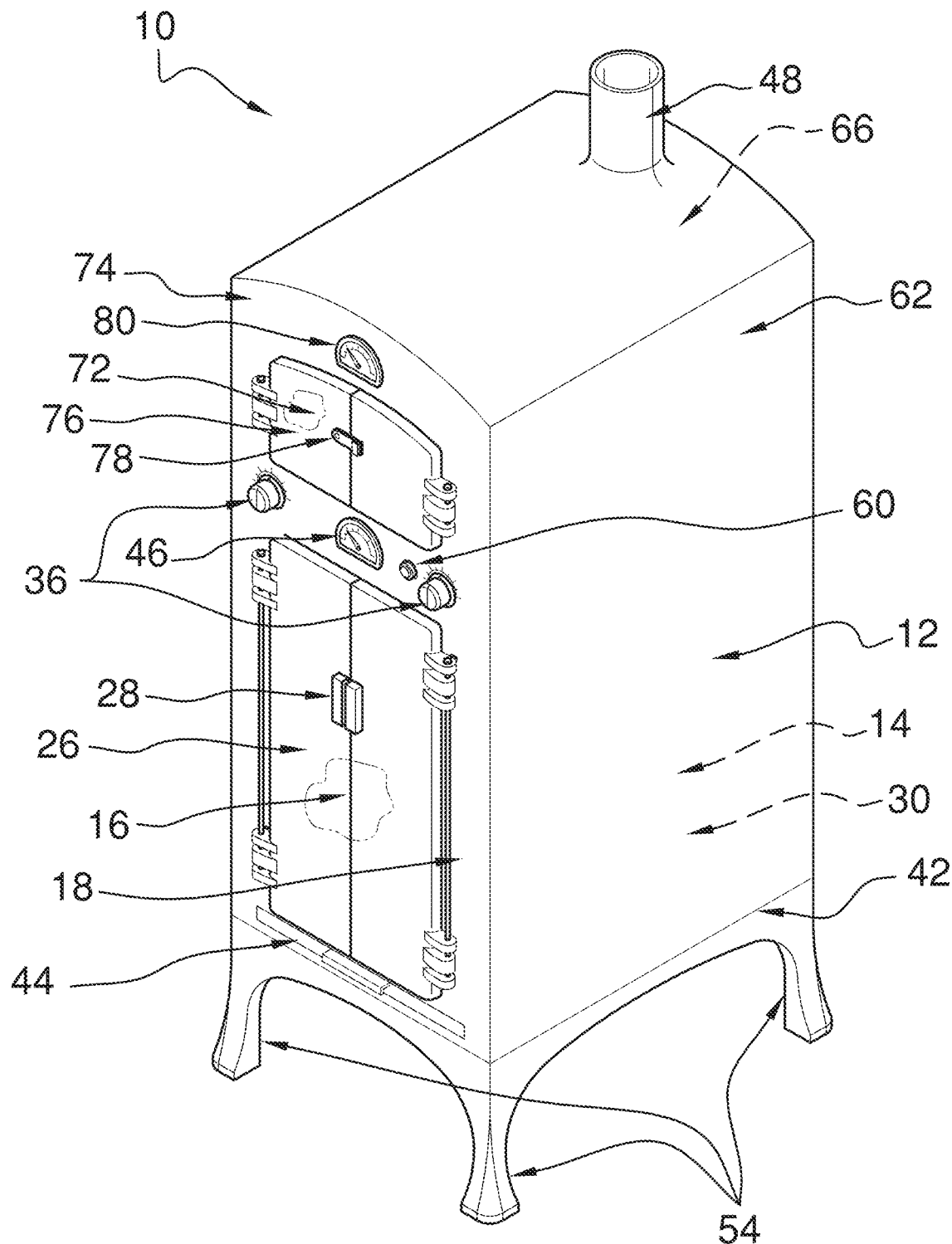

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to grilling assemblies and more particularly pertains to a new grilling assembly for uniform grilling of food with reduced flareups. The present invention discloses a grilling assembly comprising both gas burners and heating elements positioned on opposed sides of the housing, wherein one or both of the gas burners and the heating elements can be utilized for grilling a food item positioned vertically between the opposed sides.

(2) Description of Related Art Including Information Disclosed Under 37 CFR 1.97 and 1.98

The prior art relates to grilling assemblies. Prior art grilling assemblies may comprise gas burners or heating elements positioned bilaterally to a food item to be grilled, with the food item being suspended from a top of the grilling assembly or positioned on a spit or in a rack. What is lacking in the prior art is a grilling assembly comprising both gas burners and heating elements positioned on opposed sides of the housing, wherein one or both of the gas burners and the heating elements can be utilized for grilling a food item positioned vertically between the opposed sides. Also lacking in the prior art is a grilling assembly having a box positioned atop the housing, which is warmed by heat transfer, and which can be used for warming and baking.

BRIEF SUMMARY OF THE INVENTION

An embodiment of the disclosure meets the needs presented above by generally comprising a housing, which defines an interior space. An opening is positioned in a front of the housing and is configured for insertion of a retaining unit, which is engaged to a food item. The food item is positioned in the interior space substantially equally distant from opposed sides of the housing. A first door is hingedly engaged to the housing and is positioned to selectively close the opening. A pair of heaters is engaged singly to the opposed sides of the housing and is positioned in the interior space. The heaters are configured to selectively heat the interior space to grill the food item. A controller is engaged to the housing and is operationally engaged to the pair of heaters. The controller is positioned to selectively control heat output from the pair of heaters.

The vertical grilling assembly also may comprise a box, which is engaged to a top of the housing and which defines an internal space. A lower facet of the box comprises the top of the housing. The top comprises one or both of brick and stone and thus is configured for heat transfer from the interior space to the internal space. An aperture is positioned in a forward facet of the box. A second door is engaged to the box and is positioned to selectively close the aperture. Food items can be positioned in the box, on the top of the housing, for warming or baking.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is an isometric perspective view of a vertical grilling assembly according to an embodiment of the disclosure.

Figure 2:
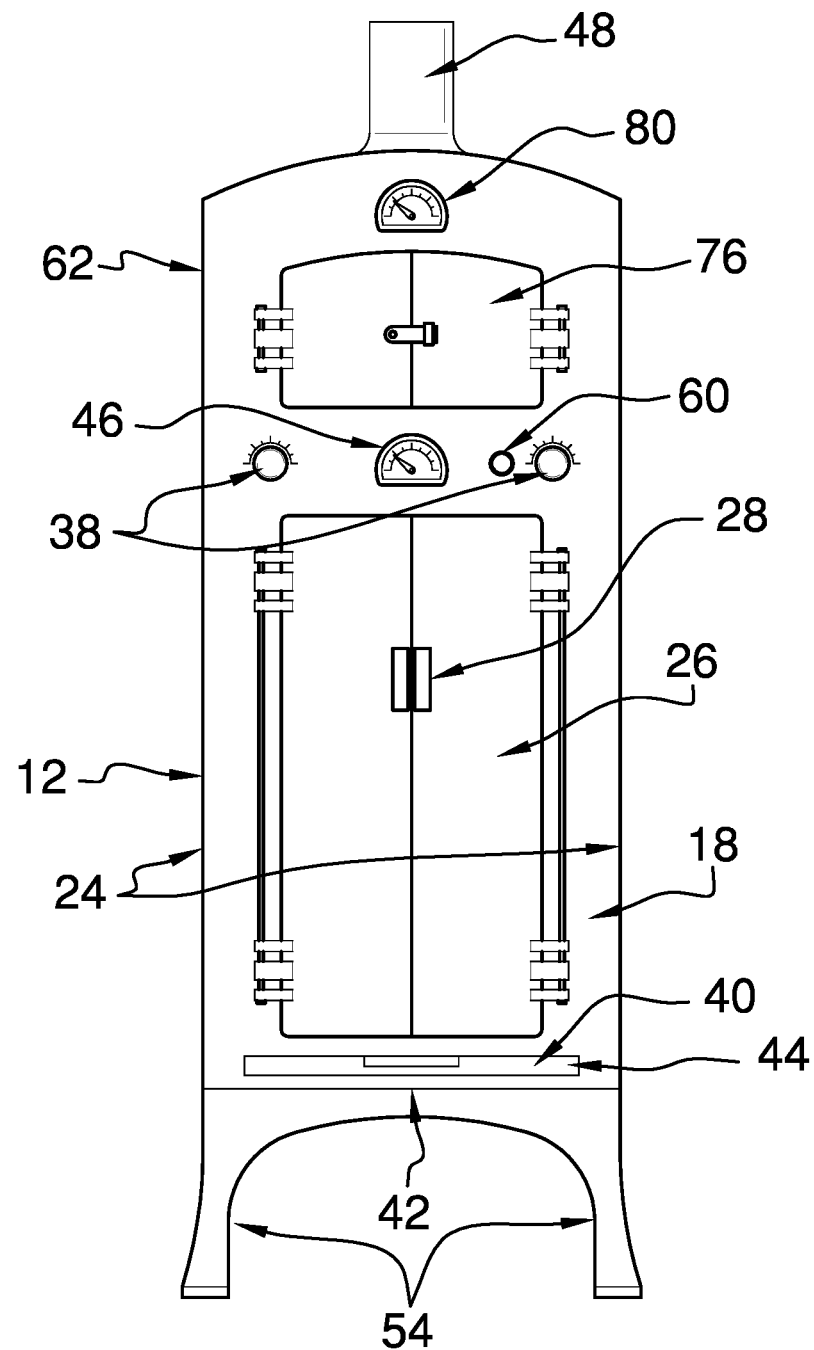
Figure 3:
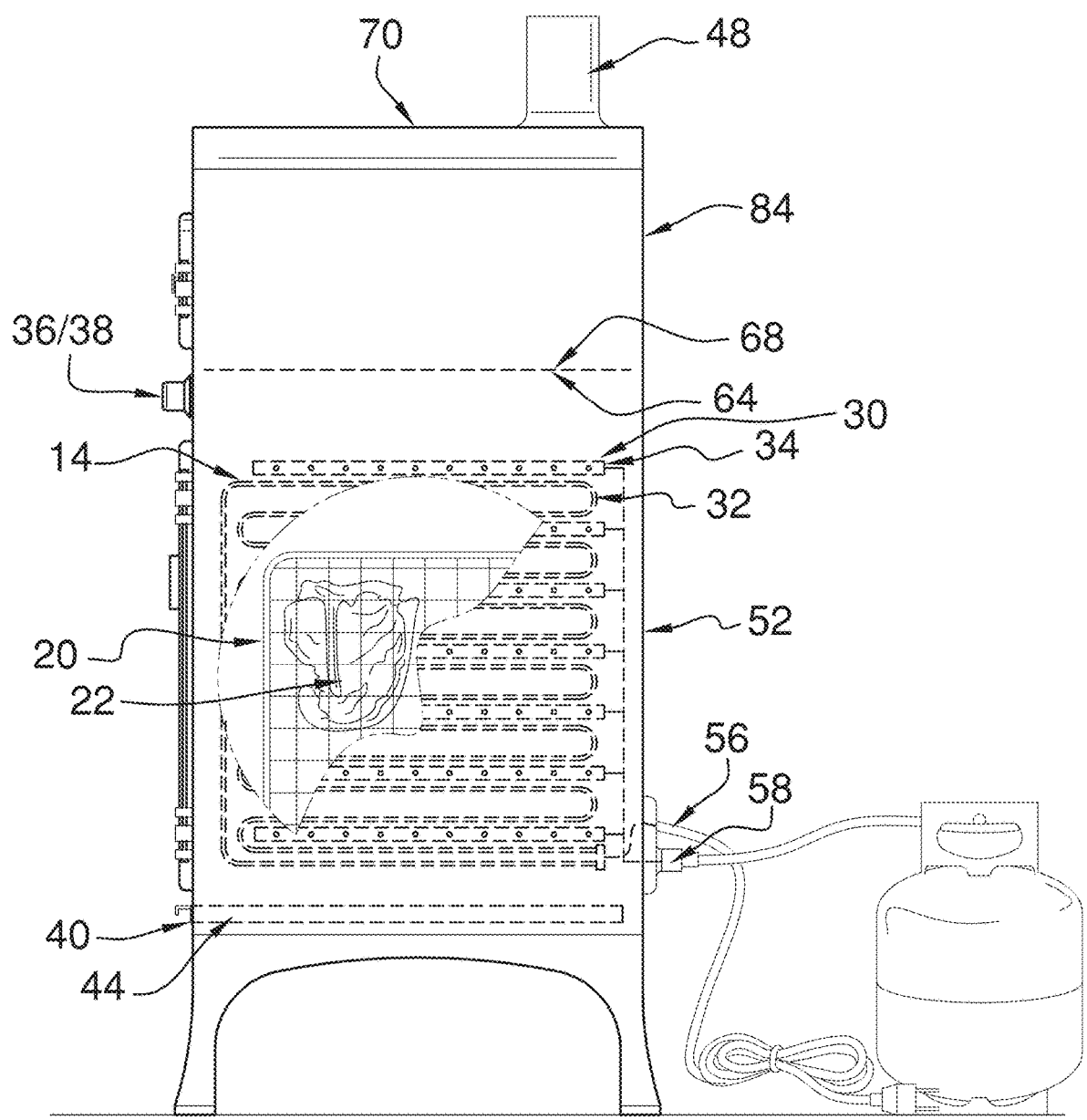
Figure 4:
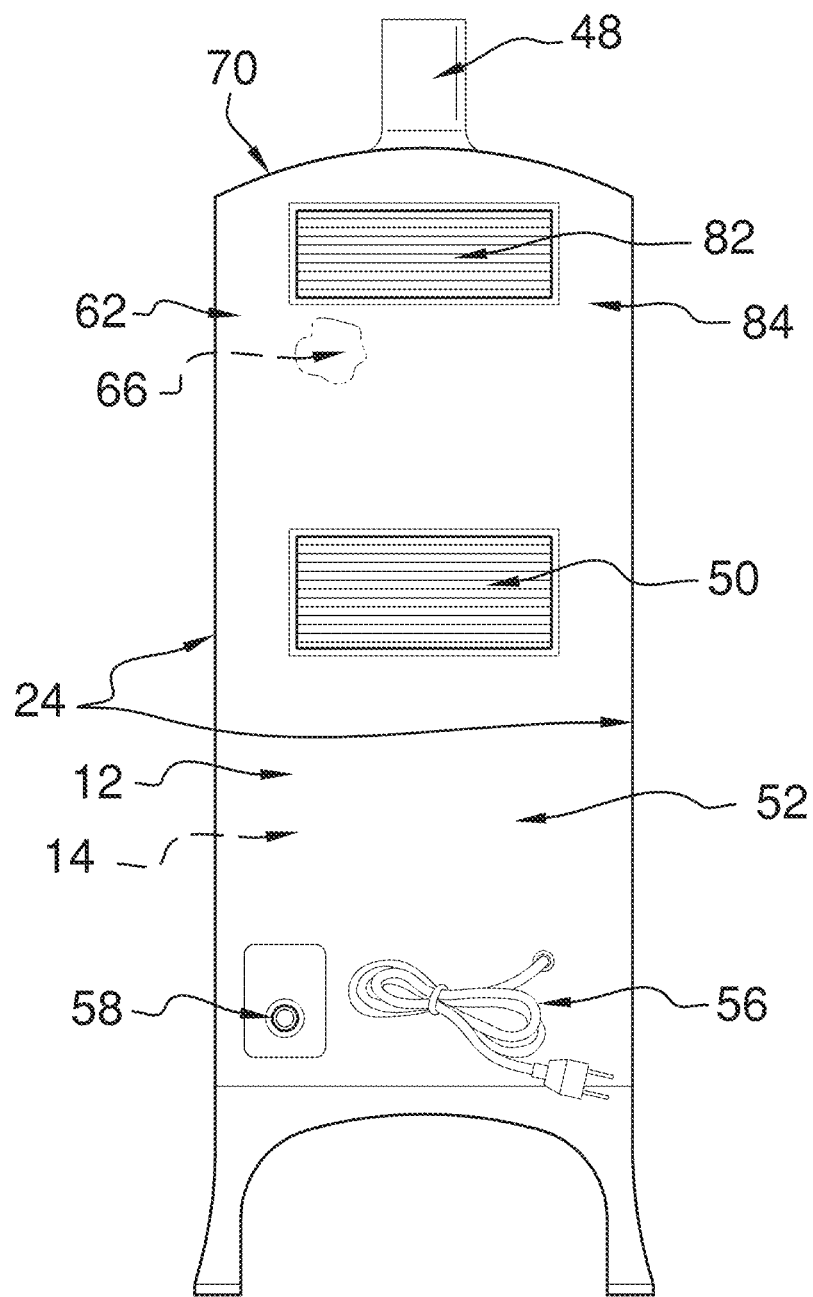
Figure 5:
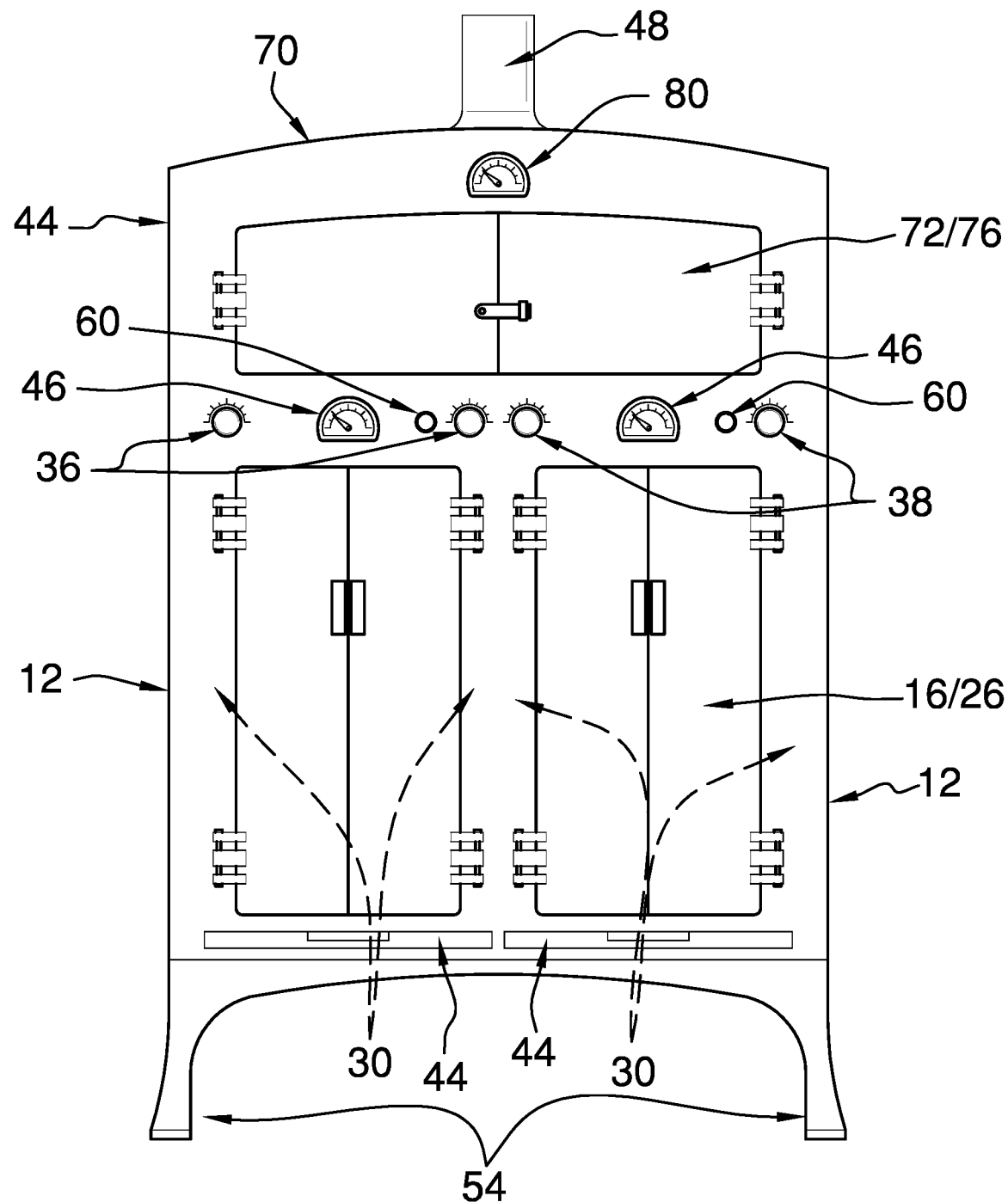

FIG. 2 is a front view of an embodiment of the disclosure.
FIG. 3 is a side view of an embodiment of the disclosure.
FIG. 4 is a rear view of an embodiment of the disclosure.
FIG. 5 is a front view of an embodiment of the disclosure.

DETAILED DESCRIPTION OF THE INVENTION

With reference now to the drawings, and in particular to FIGS. 1 through 5 thereof, a new grilling assembly embodying the principles and concepts of an embodiment of the disclosure and generally designated by the reference numeral 10 will be described.

As best illustrated in FIGS. 1 through 5, the vertical grilling assembly 10 generally comprises a housing 12, which defines an interior space 14. The present invention anticipates the vertical grilling assembly 10 comprising more than one housing 12, such as two housings 12, as shown in FIG. 5.

An opening 16 is positioned in a front 18 of the housing 12 and is configured for insertion of a retaining unit 20, which is engaged to a food item 22, so that the food item 22 is positioned in the interior space 14 substantially equally distant from opposed sides 24 of the housing 12. A variety of retaining units 20 are anticipated to be useful in positioning various types of food items 22, such as, for example, rib racks, hinged baskets, and the like.

A first door 26 is hingedly engaged to the housing 12 and is positioned to selectively close the opening 16. A handle 28 is engaged to the first door 26 and is configured to be grasped in a hand of a user so that the user is positioned to open and to close the first door 26.

A pair of heaters 30 is engaged singly to the opposed sides 24 of the housing 12 and is positioned in the interior space 14. The heaters 30 are configured to selectively heat the interior space 14 to grill the food item 22. Each heater 30 comprises one or both of a heating element 32 and a gas burner 34.

A controller 36 is engaged to the housing 12 and is operationally engaged to the pair of heaters 30. The controller 36 is positioned to control heat output from the pair of heaters 30. The controller 36 may comprise a pair of knobs 38, or other controlling means, such as, but not limited to, electronic controllers, slides, and the like. Each knob 38 is operationally engaged to a respective one of the heating element 32 and the gas burner 34. As shown in FIG. 5, wherein the vertical grilling assembly 10 comprises two housings 12, a knob 38 is engaged to each housing 12.

A slot 40 is positioned in the front 18 of the housing 12, proximate to a bottom 42 of the housing 12, as shown in FIG. 2. A tray 44 is selectively insertable through the slot 40 into the interior space 14 so that the tray 44 is positioned below the food item 22. The tray 44 is configured to collect drippings that fall from the food item 22. As the drippings do not fall onto the heaters 30, there is a reduced risk of flareups during grilling of the food items 22.

A first thermometer 46 is engaged to the housing 12 and is configured to display a temperature of the interior space 14. As shown in FIG. 5, wherein the vertical grilling assembly 10 comprises two housings 12, a first thermometer 46 is engaged to each housing 12.

A pipe 48 is engaged to the housing 12 so that the pipe 48 is in fluidic communication with the interior space 14. The pipe 48 is configured to vent smoke and fumes from the interior space 14. A lower cutout 50 is positioned in a back 52 of the housing 12. The lower cutout 50 is configured to allow for intake of air into the interior space 14, which is required when using the gas burner 34. The lower cutout 50 is louvered and thus is selectively closable, which may be desired when only the heating element 32 is in use.

A set of legs 54 is engaged to and extends from the bottom 42 of the housing 12. The legs 54 are configured to elevate the housing 12 from a surface. The first door 26 thus is positioned at a comfortable height for the user to access the opening 16.

A power cord 56 is engaged to and extends from the housing 12. The power cord 56 is operationally engaged to the heating element 32 and thus is configured to operationally engage the heating element 32 to a source of electrical current.

A connector 58 is engaged to the housing 12 and is operationally engaged to the gas burner 34. The connector 58 is configured to operationally engage a hose extending from a gas source so that the gas burner 34 is fluidically engaged to the gas source. An igniter 60 is engaged to the housing 12 and is operationally engaged to the gas burner 34. The igniter 60 is configured to ignite gas flowing from the gas burner 34.

The vertical grilling assembly 10 also may comprise a box 62, which is engaged to a top 64 of the housing 12, and which defines an internal space 66. A lower facet 68 of the box 62 comprises the top 64 of the housing 12. The top 64 of the housing 12 comprises one or both of brick and stone and thus is configured for heat transfer from the interior space 14 to the internal space 66.

An upper facet 70 of the box 62 may be arcuate, as shown in FIG. 2, so that the box 62 is domed. The pipe 48 extends through the internal space 66 and from the upper facet 70 of the box 62. An aperture 72 is positioned in a forward facet 74 of the box 62. A second door 76 is engaged to the box 62 and is positioned to selectively close the aperture 72. A grasp 78 is engaged to the second door 76 and is configured to be grasped in a hand of a user so that the user is positioned to open and to close the second door 76. Food items 22 can be positioned in the box 62, on the top 64 of the housing 12, for warming or baking.

A second thermometer 80 is engaged to the box 62 and is configured to display a temperature of the internal space 66. An upper cutout 82 is positioned in a rear facet 84 of the box 62 and is configured to allow for intake of air into the internal space 66. The upper cutout 82 is louvered so that the upper cutout 82 is selectively closable.

In use, the interior space 14 is preheated to a desired temperature by actuating the controller 36. The food item 22 is engaged to the retaining unit 20 and the retaining unit 20 then is positioned in the interior space 14 until the food item 22 is grilled. Drippings from the food item 22 are collected in the tray 44, which can be removed for cleaning as needed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A vertical grilling assembly comprising:
 a housing defining an interior space;
 an opening positioned in a front of the housing, wherein the opening is configured for insertion of a retaining unit engaged to a food item, such that the food item is positioned in the interior space equally distant from opposed sides of the housing;
 a first door hingedly engaged to the housing, such that the first door is positioned for selectively closing the opening;
 a pair of heaters engaged singly to the opposed sides of the housing and positioned in the interior space, wherein the heaters are configured for heating the interior space for grilling the food item;

a controller engaged to the housing and being operationally engaged to the pair of heaters, such that the controller is configured for selectively controlling heat output from the pair of heaters;

a box engaged to a top of the housing, the box defining an internal space, a lower facet of the box comprising the top of the housing wherein the top is configured for heat transfer from the interior space to the internal space when the top is heated, the top comprising one or both of brick and stone;

an aperture positioned in a forward facet of the box; and a second door engaged to the box, such that the second door is positioned for selectively closing the aperture.

2. The vertical grilling assembly of claim 1, wherein each heater comprises a gas burner.

3. The vertical grilling assembly of claim 2, wherein the controller comprises a pair of knobs, each knob being operationally engaged to a respective one of the heaters.

4. The vertical grilling assembly of claim 1, further including:
   a slot positioned in the front of the housing proximate to a bottom of the housing; and
   a tray selectively insertable through the slot into the interior space, such that the tray is positioned below the food item, wherein the tray is configured for collecting drippings falling from the food item.

5. The vertical grilling assembly of claim 1, further including a handle engaged to the first door and being configured for grasping in a hand of a user, positioning the user for opening and closing the first door.

6. The vertical grilling assembly of claim 1, further including a first thermometer engaged to the housing and being configured for displaying a temperature of the interior space.

7. The vertical grilling assembly of claim 1, further including a pipe engaged to the housing, such that the pipe is in fluidic communication with the interior space, wherein the pipe is configured for venting smoke and fumes from the interior space.

8. The vertical grilling assembly of claim 2, further including:
   a pipe engaged to the housing, such that the pipe is in fluidic communication with the interior space, wherein the pipe is configured for venting smoke and fumes from the interior space; and
   a lower cutout positioned in a back of the housing, wherein the lower cutout is configured for intaking of air into the interior space, the lower cutout being louvered such that the lower cutout is selectively closable.

9. The vertical grilling assembly of claim 1, further including a set of legs engaged to and extending from a bottom of the housing, wherein the legs are configured for elevating the housing from a surface.

10. The vertical grilling assembly of claim 2, further including a power cord engaged to and extending from the housing, the power cord being operationally engaged to the heating element, the power cord being configured for operationally engaging the heating element to a source of electrical current.

11. The vertical grilling assembly of claim 2, further including a connector engaged to the housing and being operationally engaged to each gas burner, the connector being configured for operationally engaging a hose extending from a gas source, such that ach gas burner is fluidically engaged to the gas source.

12. The vertical grilling assembly of claim 2, further including an igniter engaged to the housing and being operationally engaged to each gas burner, wherein the igniter is configured for igniting gas flowing from each gas burner.

13. The vertical grilling assembly of claim 1, further including an upper facet of the box being arcuate, such that the box is domed.

14. The vertical grilling assembly of claim 1, further including a pipe engaged to the housing, such that the pipe is in fluidic communication with the interior space, wherein the pipe is configured for venting smoke and fumes from the interior space, the pipe extending through the internal space and from an upper facet of the box.

15. The vertical grilling assembly of claim 1, further including a grasp engaged to the second door and being configured for grasping in a hand of a user, positioning the user for opening and closing the second door.

16. The vertical grilling assembly of claim 1, further including a second thermometer engaged to the box and being configured for displaying a temperature of the internal space.

17. The vertical grilling assembly of claim 1, further including an upper cutout positioned in a rear facet of the box, wherein the upper cutout is configured for intaking of air into the internal space, the upper cutout being louvered such that the upper cutout is selectively closable.

18. A vertical grilling assembly comprising:
   a housing defining an interior space;
   an opening positioned in a front of the housing, wherein the opening is configured for insertion of a retaining unit engaged to a food item, such that the food item is positioned in the interior space equally distant from opposed sides of the housing;
   a first door hingedly engaged to the housing, such that the first door is positioned for selectively closing the opening;
   a pair of heaters engaged singly to the opposed sides of the housing and positioned in the interior space, wherein the heaters are configured for heating the interior space for grilling the food item, each heater comprising a gas burner;
   a controller engaged to the housing and being operationally engaged to the pair of heaters, such that the controller is configured for selectively controlling heat output from the pair of heaters, the controller comprising a pair of knobs, each knob being operationally engaged to a respective one of the heaters;
   a slot positioned in the front of the housing proximate to a bottom of the housing;
   a tray selectively insertable through the slot into the interior space, such that the tray is positioned below the food item, wherein the tray is configured for collecting drippings falling from the food item;
   a handle engaged to the first door and being configured for grasping in a hand of a user, positioning the user for opening and closing the first door;
   a first thermometer engaged to the housing and being configured for displaying a temperature of the interior space;
   a pipe engaged to the housing, such that the pipe is in fluidic communication with the interior space, wherein the pipe is configured for venting smoke and fumes from the interior space;
   a lower cutout positioned in a back of the housing, wherein the lower cutout is configured for intaking of air into the interior space, the lower cutout being louvered such that the lower cutout is selectively closable;

a set of legs engaged to and extending from the bottom of the housing, wherein the legs are configured for elevating the housing from a surface;

a power cord engaged to and extending from the housing, the power cord being operationally engaged to the heating element, the power cord being configured for operationally engaging the heating element to a source of electrical current;

a connector engaged to the housing and being operationally engaged to each gas burner, the connector being configured for operationally engaging a hose extending from a gas source, such that each gas burner is fluidically engaged to the gas source;

an igniter engaged to the housing and being operationally engaged to each gas burner, wherein the igniter is configured for igniting gas flowing from each gas burner;

a box engaged to a top of the housing, the box defining an internal space, a lower facet of the box comprising the top of the housing, the top comprising one or both of brick and stone, wherein the top is configured for heat transfer from the interior space to the internal space, an upper facet of the box being arcuate, such that the box is domed, the pipe extending through the internal space and from the upper facet of the box;

an aperture positioned in a forward facet of the box;

a second door engaged to the box, such that the second door is positioned for selectively closing the aperture;

a grasp engaged to the second door and being configured for grasping in the hand of the user, positioning the user for opening and closing the second door, a second thermometer engaged to the box and being configured for displaying a temperature of the internal space; and an upper cutout positioned in a rear facet of the box, wherein the upper cutout is configured for intaking of air into the internal space, the upper cutout being louvered such that the upper cutout is selectively closable.

* * * * *